US010915940B2

(12) United States Patent
Handy Bosma et al.

(10) Patent No.: US 10,915,940 B2
(45) Date of Patent: Feb. 9, 2021

(54) METHOD, MEDIUM, AND SYSTEM FOR ANALYZING USER SENTIMENT TO DYNAMICALLY MODIFY COMMUNICATION SESSIONS

(71) Applicant: International Business Machines Corporation, Armonk, NY (US)

(72) Inventors: John Handy Bosma, Leander, TX (US); Lalitha Krishnamoorthy, Round Rock, TX (US); Sri Sai Anupama Pasumarthy, New York, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/377,409

(22) Filed: Apr. 8, 2019

(65) Prior Publication Data

US 2020/0320608 A1    Oct. 8, 2020

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06F 3/016* (2013.01); *G06F 16/90332* (2019.01); *G06F 16/9535* (2019.01); *G06Q 30/0222* (2013.01)

(58) Field of Classification Search
CPC ............ G06Q 30/0631; G06Q 30/0222; G06F 16/90332; G06F 16/9535; G06F 3/016
See application file for complete search history.

(56) References Cited

U.S. PATENT DOCUMENTS 6,792,399 B1    9/2004  Phillips et al.
8,001,008 B2    8/2011  Engle
(Continued)

OTHER PUBLICATIONS

Medhat et al.. Sentiment analysis algorithms and applications: A survey, https://www.sciencedirect.com/science/jrticle/pii/S2090447914000550, Ain Shams Engineering Journal (2014) 5,1093-1113. (Year: 2014).*

(Continued)

*Primary Examiner* — Matthew E Zimmerman
(74) *Attorney, Agent, or Firm* — Diana Roberts Gerhardt; Edell, Shapiro & Finnan, LLC (57) ABSTRACT

A computer system analyzes user sentiment to dynamically modify a communication session. One or more user interactions are captured during a communication session, wherein a machine learning model is updated based on the captured user interactions. A likelihood score of a user terminating the communication session before performing one or more desired actions is calculated. In response to determining that the likelihood score is above a threshold value, one or more queries are presented, during the communication session, to the user, wherein the one or more queries are selected using the machine learning model. Received user feedback is analyzed to determine a user sentiment. The communication session is dynamically modified based on to the user feedback and the user sentiment. Embodiments of the present invention further include a method and program product for analyzing user sentiment to dynamically modify a communication session in substantially the same manner described above.

15 Claims, 4 Drawing Sheets

(51) Int. Cl.
*G06F 3/01* (2006.01)
*G06F 16/9032* (2019.01)
*G06F 16/9535* (2019.01)
*G06Q 30/02* (2012.01)

(56) References Cited

U.S. PATENT DOCUMENTS

| | | | |
|---|---|---|---|
| 8,370,350 | B2 | 2/2013 | Friedlander et al. |
| 8,767,948 | B1 | 7/2014 | Riahi et al. |
| 9,105,042 | B2 | 8/2015 | Sylves |
| 9,386,152 | B2 | 7/2016 | Riahi et al. |
| 10,558,693 | B1 * | 2/2020 | Elieson ............... G06F 16/3329 |
| 2009/0287683 | A1 | 11/2009 | Bennett |
| 2014/0289006 | A1 * | 9/2014 | Palmer ................ G06F 16/9535 705/7.31 |
| 2015/0134654 | A1 | 5/2015 | Fuzell-Casey |
| 2017/0310820 | A1 | 10/2017 | Kao et al. |
| 2018/0033042 | A1 * | 2/2018 | Wang ................. G06Q 30/0601 |
| 2020/0258141 | A1 * | 8/2020 | Habraken ............. G06F 16/957 |

OTHER PUBLICATIONS

Rafaeli et al., "The Impact of Call Center Employees' Customer Orientation Behaviors on Service Quality." Journal of Service Research 103, Feb. 2008, pp. 239-255.

Medhat et al., Sentiment analysis algorithms and applications: A survey, https://www.sciencedirect.com/science/article/pii/S2090447914000550, Ain Shams Engineering Journal (2014) 5, 1093-1113.

Sentiment Analysis in Marketing: Time to Profit, https://becominghuman.ai/sentiment-analysis-in-marketing-time-to-profit-155b5a1cca7a, Gallantra Business Intelligence, Jan. 11, 2018, 6 pages.

Watson Tone Analyzer, https://www.ibm.com/watson/services/tone-analyzer/, retrieved from Internet Apr. 3, 2019, 7 pages.

* cited by examiner

METHOD, MEDIUM, AND SYSTEM FOR ANALYZING USER SENTIMENT TO DYNAMICALLY MODIFY COMMUNICATION SESSIONS

BACKGROUND

1. Technical Field

Present invention embodiments relate to communication sessions, and more specifically, to analyzing a user's sentiment to dynamically modify a communication session (e.g., to focus searches for rapid identification of desired content, etc.).

2. Discussion of the Related Art

As patrons increasingly purchase goods and services online, the need for personalized content recommendations has increased. In particular, when patrons are exposed to an ever-expanding selection of offerings, a patron may experience greater difficulty in identifying the particular offerings that satisfy the patron's requirements. The process of searching, sorting, and filtering results can overwhelm a patron, and may not yield discernable progress toward a favorable outcome. Further, a patron who might otherwise purchase a good or service may be disinclined to do so when confronted with a burdensome selection process.

SUMMARY

According to one embodiment of the present invention, a computer system analyzes user sentiment to dynamically modify a communication session comprising. One or more user interactions are captured during a communication session over a network, wherein a machine learning model is updated based on the one or more user interactions. A likelihood score of a user terminating the communication session before performing one or more desired actions is calculated. In response to determining that the likelihood score is above a threshold value, one or more queries are presented, during the communication session, to the user, wherein the one or more queries are selected using the machine learning model. Received user feedback is analyzed to determine a user sentiment. The communication session is dynamically modified based on to the user feedback and the user sentiment. Embodiments of the present invention further include a method and program product for analyzing user sentiment to dynamically generate personalized content recommendations in substantially the same manner described above.

BRIEF DESCRIPTION OF THE DRAWINGS

Generally, like reference numerals in the various figures are utilized to designate like components.

DETAILED DESCRIPTION

Present invention embodiments relate to dynamically modifying a communication session, and more specifically, to analyzing a user's sentiment to dynamically modify a communication sessions. When a user searches for goods or services on an electronic commerce platform, the user may be overwhelmed by a large number of results, leading to customer drop-out and loss of sales. Additionally, a user who is not knowledgeable of a particular field may be unable to articulate a query with enough specificity. While additional search and filtering may provide a user with the desired results, some requirements may not be supported by search filter criteria, and the process may not result in a progression toward a matching good or service. Furthermore, mass customization approaches, such as the use of decision trees or interactive configurators, may be costly in terms of computation and manual configuration requirements.

Present invention embodiments use a machine learning model to identify when a user is likely to terminate a communication session without performing a desired action, such as making a purchase or trying an item. The user may then be presented with one or more queries, and based on the user's responses, a sentiment of the user may be determined. Based on the user's sentiment, the user's communication session may be modified to present new paths or modes of interaction to the user in order to retain the user's attention and to encourage performance of a desired action.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
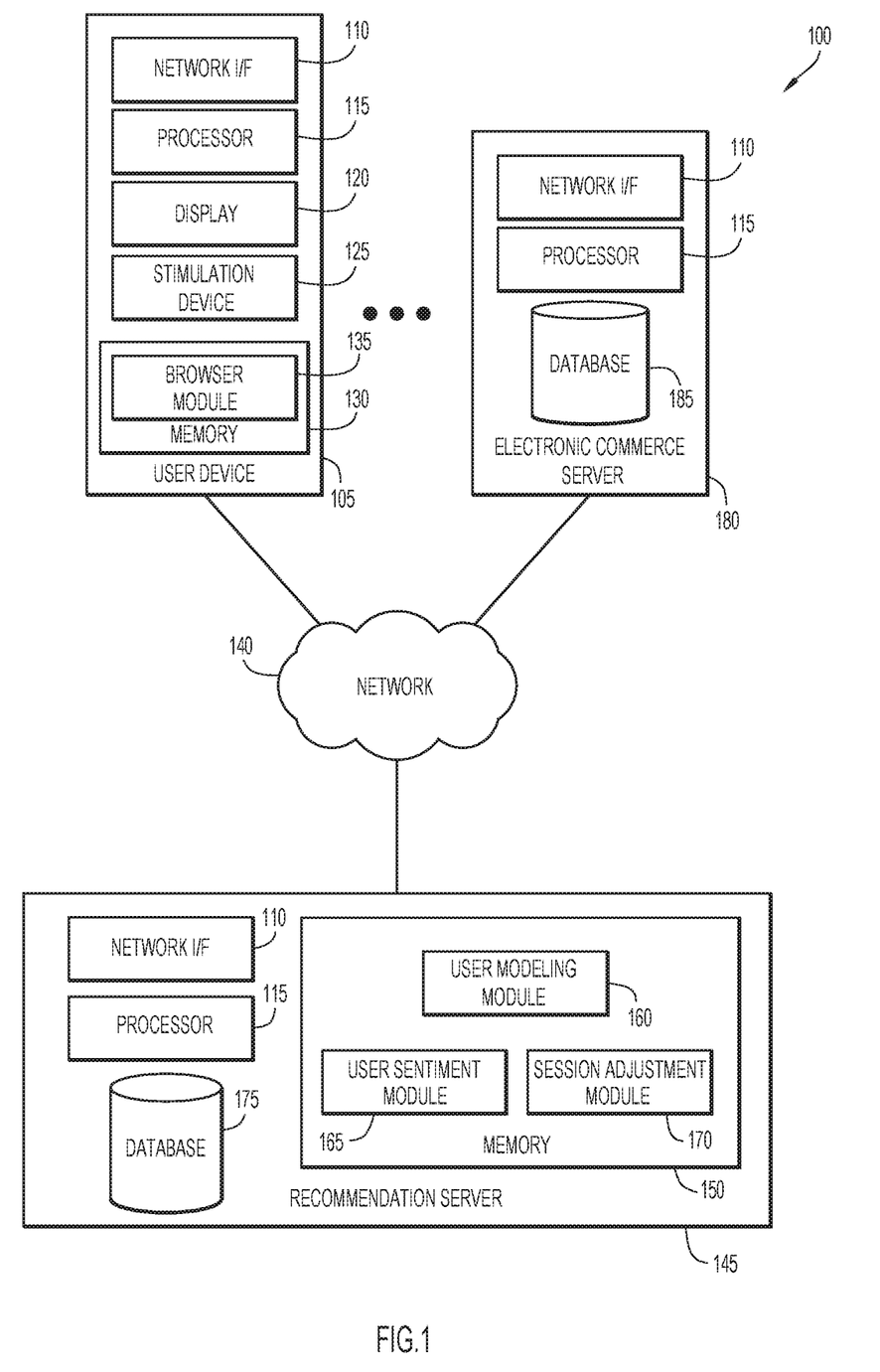
FIG. 1 is a block diagram depicting a computing environment for dynamically modifying a communication session in accordance with an embodiment of the present invention.

Present invention embodiments will now be described in detail with reference to the Figures. FIG. 1 is a block diagram depicting a computing environment 100 for dynamically modifying a communication session in accordance with an embodiment of the present invention. As depicted, computing environment 100 includes a user device 105, a session management server 145, and an electronic commerce server 180. It is to be understood that the functional division among components of computing environment 100 have been chosen for purposes of explaining present invention embodiments and is not to be construed as a limiting example.

User device 105 includes a network interface 110, at least one processor 115, a display 120, a stimulation device 125, and memory 130. Memory 130 may include communication or browser module 135. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 110 enables components of user device 105 to send and receive data over a network, such as network 140. User device 105 may include internal and external hardware components, as depicted and described in further detail with respect to FIG. 4.

Display 120 may include any electronic device capable of presenting information in a visual form. For example, display 120 may be a liquid crystal display (LCD), a cathode ray tube (CRT) display, a light-emitting diode (LED) display, an electronic ink display, and the like. Information relating to the browsing of offerings and engagement in electronic commerce may be presented to a user of user device 105 via display 120.

Stimulation device 125 may include any device capable of providing haptic feedback to a user of user device 105. In some embodiments, stimulation device 125 includes a vibration device, such as a linear resonant actuator or eccentric rotating mass motor, to transmit haptic feedback to the user's person. Stimulation device 125 may provide a variety of haptic feedback sensations by varying one or more of a strength of a vibration, a duration of a vibration, and a combinations thereof to produce vibrational patterns.

Browser module 135 may include one or more modules or units to perform various functions of present invention embodiments described below. Browser module 135 may be implemented by any combination of any quantity of software and/or hardware modules or units, and may reside within memory 130 of user device 105 for execution by a processor, such as processor 115.

Browser module 135 may present information relating to electronic commerce to a user of user device 105. In general, browser module 135 provides a communication session that enables a user to browse offerings of a vendor, including goods and/or services. Browser module 135 may include any web browser or other communication application for establishing communication sessions (e.g., for browsing offerings on one or more electronic commerce platforms, etc.). Browser module 135 may access one or more databases, such as database 185 of electronic commerce server 180, to retrieve information relating to offerings, such as names, descriptions, pricing information, and the like. A user may navigate through offerings by any known or other mechanisms, including submitting querying via a search interface, applying filters to offerings, and the like. Browser module 135 may enable a user of user device 105 to purchase offerings, add offerings to a wish list or virtual shopping cart, share offerings with others, and the like. In some embodiments, browser module 135 collects any input provided by a user to share with session management server 145, including user actions, user queries, purchases, browsing history, and the like. As a user conducts a communication session, browser module 135 may enable the communication session to be modified by session management server 145 and its components.

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between user device 105, session management server 145, and/or electronic commerce server 180 via their respective network interfaces 110 in accordance with embodiments of the present invention.

Session management server 145 includes a network interface 110, at least one processor 115, memory 150, and a database 175. Memory 150 includes a modeling module 160, a sentiment module 165, and a session adjustment module 170. In various embodiments of the present invention, server 145 may include a laptop computer, a tablet computer, a netbook computer, a personal computer (PC), a desktop computer, a personal digital assistant (PDA), a smart phone, or any programmable electronic device capable of executing computer readable program instructions. Network interface 110 enables components of server 145 to send and receive data over a network, such as network 140. In general, session management server 145 monitors a user during a communication session, determines a user's sentiment, and modifies communication sessions based on user sentiment. Session management server 145 may include internal and external hardware components, as depicted and described in further detail with respect to FIG. 4.

Modeling module 160, sentiment module 165, and session adjustment module 170 may include one or more modules or units to perform various functions of present invention embodiments described below. Modeling module 160, sentiment module 165, and session adjustment module 170 may be implemented by any combination of any quantity of software and/or hardware modules or units, and may reside within memory 150 of session management server 145 for execution by a processor, such as processor 115.

Modeling module 160 may receive and analyze information relating to a user's activity captured during a communication session. In some embodiments, modeling module 160 receives information relating to a user's activity from user device 105 and/or electronic commerce server 180 via one or more Application Programming Interfaces (APIs). Modeling module 160 may utilize known or other machine learning techniques to model behavior of a user in order to predict the likelihood that a user will perform a desired action during a communication session. A desired action may include a user purchasing an offering, a user initiating a purchase of an item (e.g., proceeding to a check-out page), a user adding an offering to a shopping cart, a user bookmarking an offering, a user registering for a trial of an offering, a user sharing an offering with another, and the like. In order to model user behavior, modeling module 160 analyzes information in real time as the information is captured by browser module 135 during a communication session. Communication session information may include any input provided by a user, including queries, selections (e.g., mouse clicks, taps, etc.), and the like. Communication session information may also include a user's browsing history, including inbound link information, advertisements served to a user during the communication session, a user's path that is navigated during the communication session, offerings displayed to the user, a user's eye gaze information, dwell time, and the like.

Modeling module 160 may establish a machine learning model to predict user behavior based on the information captured during a communication session. The machine learning model may maintain a running prediction of the likelihood of a user engaging in a desired action versus dropping out of the communication session. Information captured during a communication session may be analyzed to calculate one or more metrics, which may be used to calculate a likelihood score representing a user's likelihood terminating a communication session without performing a desired action. Each metric may correspond to an aspect of the user's activity, such as a user's time spent browsing a particular offering, amount of searches performed, number of results through which a user browses, and the like. In some embodiments, each metric may be assigned a particular weight in order to emphasize or deemphasize the metric's degree of influence on the likelihood score. Modeling module 160 may provide initial seed data to the machine learning model, and may update the machine learning model with information captured from previous communication sessions of other users as well as with any available prior information of a current user. Modeling module 160 may apply known or other machine learning techniques to the learning model; in some embodiments, modeling module 160 may compare multiple machine learning techniques using empirical data in order to select a machine learning technique. For the machine learning model, modeling module 160 may utilize reinforcement learning, competitive neural networks, and/or supervised learning. Modeling module 160 may compare predicted outcomes of a user's communication session to actual outcomes and update the learning model over time. For example, weights of metrics may be modified to more accurately predict user behavior. The machine learning model may be stored in memory in order to meet performance and scalability demands, and the machine learning model may be called via a script that is embedded in a page or view of a communication session, such as a web page.

Based on prior learned behavior, the machine learning model may maintain a local prediction of the content of exit behaviors (e.g., user behaviors associated with terminating a session without performing a desired action) in a link neighborhood. A link neighborhood may include a current page or view, a preceding page or view, or a page or view that is one link away from a topically-relevant page or instance of content that may be desired by a user, including any content belonging to a category of offerings that may be desired by a user. Additionally or alternatively, the learning model may utilize a predictive function to identify exit behaviors based on known information relating to other users who are similar to a user (e.g., based on shared identified attributes of the users). The machine learning model may select a set of best interventions for the communication session based on the predictive function. In some embodiments, the machine learning model is updated by incorporating information about outcomes of adjustments to communication sessions over time, thereby improving the machine learning model.

Modeling module 160 may present a question to determine an intent of the user and to elicit responses from the user that can be processed to determine a sentiment of the user. In some embodiments, modeling module 160 determines a particular moment to present questions to the user, such as when the user's likelihood score surpasses a particular threshold, or a predefined amount of time after the threshold is surpassed.

Modeling module 160 may generate one or more questions for the user. Each question may be a structured question that includes predefined answers and/or a field for a user to provide open-ended input. For example, a question may ask a user to select a category of offering, and may provide multiple selectable categories as well as an opportunity for the user to input a custom response. In some embodiments, modeling module 160 may provide questions that correspond to a Likert scale format. For example, a user may answer a question by selecting a particular number out of a range of numbers. Modeling module 160 may personalize questions for a user based on user feedback and any other data relating to a user. For example, modeling module 160 may generate a question such as "How confident are you that we offer products and services related to your search?" and may enable a user to provide a response by selecting a value in a Likert scale and by providing additional open-ended feedback. According to another example embodiment, modeling module 160 may generate a question such as "Which need best reflects your interest in our products?" and may enable a user to input a selection of terms that are most closely related to user queries, derived from keyword metadata obtained from an inbound link information, and the like. Modeling module 160 may also generate a question that prompts a user to rank features of an offering in order of importance to determine an intent of the user. For example, modeling module 160 may generate a question such as "In regard to our software-as-a-service offering, please rank the following factors in descending importance to you: price per seat, overall price, functionality, contract terms, and portability," and a user may optionally add open-ended feedback. The machine learning model of modeling module 160 may determine the relevance of questions based on any factors that the machine learning model has identified as predictive of a user terminating a communication session without performing a desired action.

Sentiment module 165 may analyze user-provided responses to determine a sentiment of a user. Sentiment module 165 may utilize known or other sentiment analysis techniques to review feedback from a user. In some embodiments, a user's feedback is processed while the user inputs the text. Sentiment module 165 may determine whether a user's sentiment is a positive sentiment (e.g., happiness, joy, etc.) or a negative sentiment (e.g., displeasure, anger, etc.). In some embodiments, sentiment module 165 may also determine a magnitude of the sentiment (e.g., the degree to which a sentiment is positive or negative). The machine learning model may analyze user sentiment information to identify relations between captured user activity and user sentiments.

In some embodiments, sentiment module 165 provides instructions to a user device, such as user device 105, to provide haptic feedback to the user based on the user's determined sentiment. Stimulation device 125 of user device 105 may activate to indicate to a user that the user is experiencing a positive or negative sentiment. For example, sentiment module 165 may instruct stimulation device 125 to provide a strong vibration pattern of short, rapid pulses when a user's sentiment is negative, and a weak vibration pattern of longer pulses when a user's sentiment is positive.

Session adjustment module 170 may adjust a user's communication session to engage a user and to increase the likelihood that a user performs a desired action. Based on a user's sentiment and intent, modeling module 160 may determine one or more actions to perform to engage the user. Actions may include offering a discount, providing the user with contact information for a vendor, filtering presented offerings to the user, presenting offerings to the user that are associated with a positive user sentiment, and the like. Session adjustment module 170 may send instructions to adjust the session of a user to browser module 135 of client device 105 to cause the communication session to be adjusted. In some embodiments, a communication session is altered according to the degree of a user's sentiment. For example, users who are determined to be experiencing more negative sentiments may receive more favorable discounts. In some embodiments, session adjustment module 170 instructs stimulation device 125 of user device 105 to provide a haptic feedback to indicate to a user that an adjustment is occurring.

Database 175 may include any non-volatile storage media known in the art. For example, database 175 can be implemented with a tape library, optical library, one or more independent hard disk drives, or multiple hard disk drives in a redundant array of independent disks (RAID). Similarly, data on database 175 may conform to any suitable storage architecture known in the art, such as a file, a relational database, an object-oriented database, and/or one or more tables. Database 175 may store data relating to modeling user behavior, including one or more learning models. Further, database 175 may store data relating to questions for users, including question templates, previous user feedback, sentiments associated with user feedback and activity, and the like.

Electronic commerce server 180 includes a network interface 110, at least one processor 115, and a database 185. In various embodiments of the present invention, electronic commerce server 180 may include a laptop computer, a tablet computer, a netbook computer, a personal computer (PC), a desktop computer, a personal digital assistant (PDA), a smart phone, or any programmable electronic device capable of executing computer readable program instructions. Network interface 110 enables components of electronic commerce server 180 to send and receive data over a network, such as network 140. Electronic commerce server 180 may include internal and external hardware components, as depicted and described in further detail with respect to FIG. 4.

Database 185 may include any non-volatile storage media known in the art. For example, database 185 can be implemented with a tape library, optical library, one or more independent hard disk drives, or multiple hard disk drives in a redundant array of independent disks (RAID). Similarly, data on database 185 may conform to any suitable storage architecture known in the art, such as a file, a relational database, an object-oriented database, and/or one or more tables. Database 185 may store data relating to electronic commerce, including offerings (e.g., goods and/or services), prices of offerings, and the like. A user of client device 105 may browse offerings via browser module 135, which accesses database 185 to retrieve data corresponding to the offerings.

Figure 2:
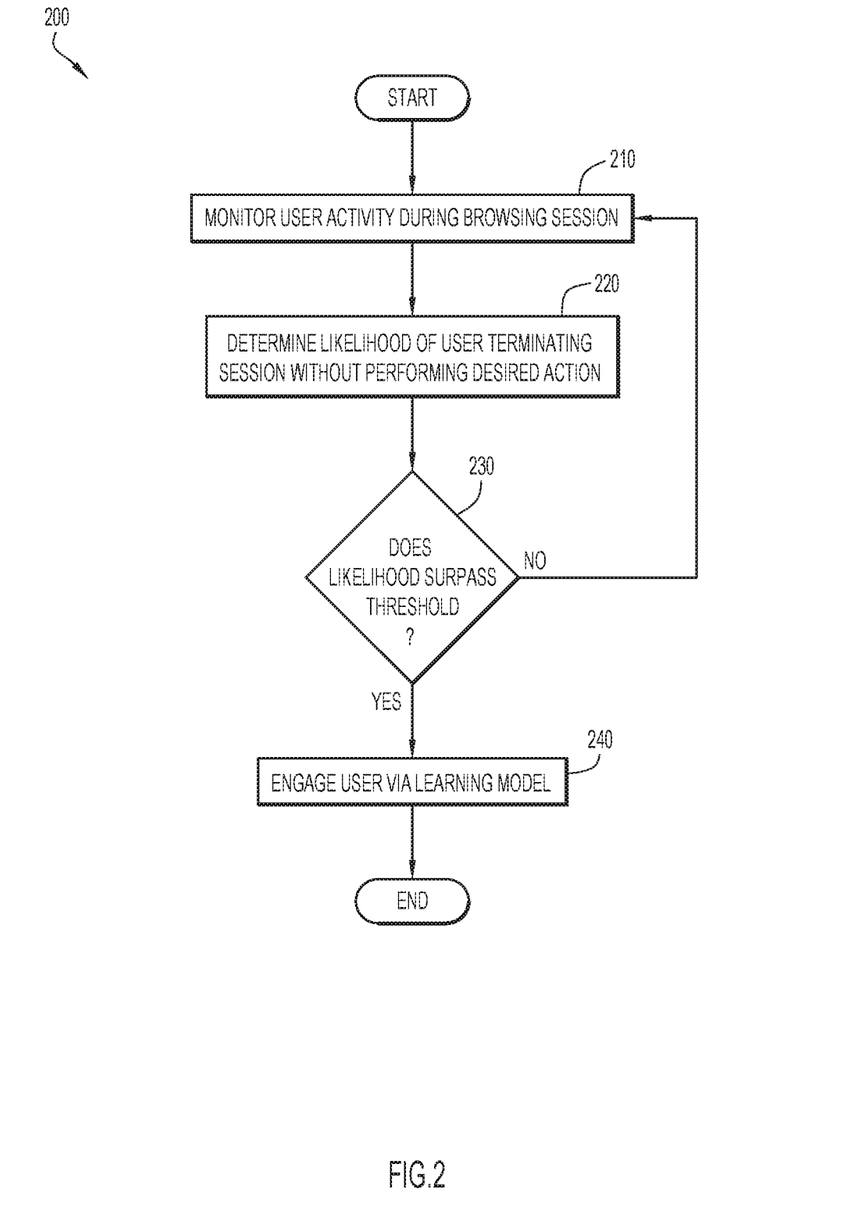
FIG. 2 is a flow chart depicting a method of monitoring user engagement in accordance with an embodiment of the present invention.

FIG. 2 is a flow chart depicting a method 200 of monitoring user engagement in accordance with an embodiment of the present invention.

A user's activity is monitored during a communication session at operation 210. User activity may be captured by browser module 135 and transmitted to modeling module 160 of session management server 145 for monitoring and analysis. Communication session information may include any user activity, such as user-submitted queries, user selections (e.g., mouse clicks, taps, etc.), and the like. Communication session information may also include a user's browsing history, including inbound link information, advertisements served to a user during the communication session, a user's path that is navigated during the communication session, offerings displayed to the user, a user's eye gaze information, dwell time, and the like.

The likelihood of a user terminating the communication session without performing one or more desired actions is calculated at operation 220. A user's activity may be modeled using a machine learning model of modeling module 160 to calculate one or more metrics. The metrics may be used to calculate a likelihood score representing a user's likelihood for terminating a communication session without performing a desired action. Each metric may correspond to an aspect of the user's activity, such as a user's time spent browsing a particular offering, amount of searches performed, number of results through which a user browses, and the like. In some embodiments, each metric may be assigned a particular weight in order to emphasize or deemphasize the metric's degree of influence on the likelihood score.

Operation 230 determines whether the likelihood of a user terminating the communication session without performing a desired action surpasses a predetermined threshold. The likelihood score of a user may be compared to a predetermined value, and if the likelihood score surpasses the predetermined value, then the user is engaged via a machine learning model at operation 240. The machine learning model may begin to engage a user by presenting one or more questions, and based on the user's feedback, may adjust the user's communication session accordingly.

Figure 3:
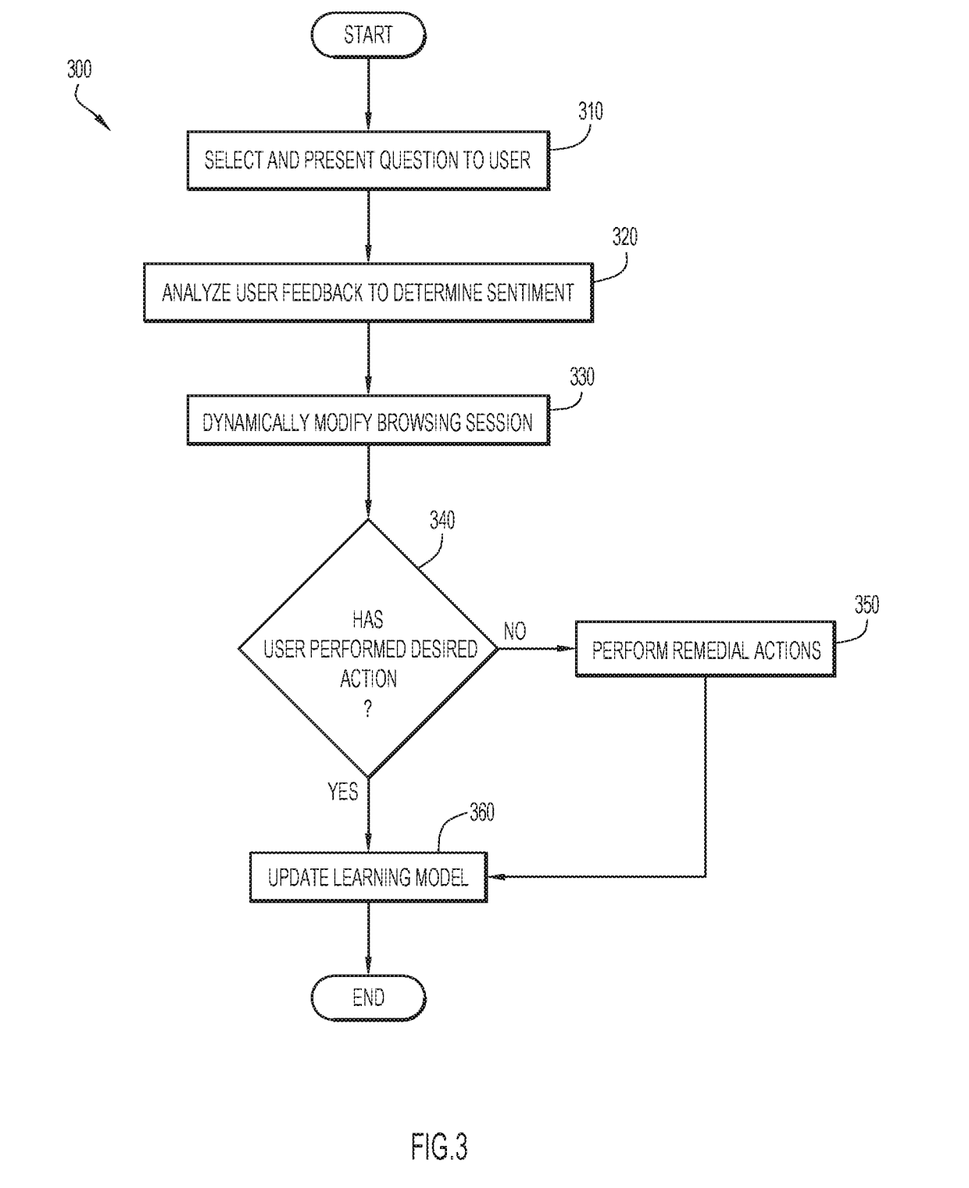
FIG. 3 is a flow chart depicting a method of adjusting a communication session in accordance with an embodiment of the present invention.

FIG. 3 is a flow chart depicting a method 300 of adjusting a communication session in accordance with an embodiment of the present invention.

One or more questions are selected and presented to a user at operation 310. Each question may be selected by modeling module 160, which uses a machine learning model to generate questions based on a user's actions during a communication session. A question may elicit user feedback in the form of a close-ended selection as well as open-ended feedback. For example, a question may ask a user to rate, on a scale of one to ten, how important a particular feature of an offering is to a user, and the question may also include a field in which the user can enter free text.

User feedback is analyzed to determine a user sentiment at operation 320. Sentiment module 165 may perform sentiment analysis on a user's feedback to determine whether a user is exhibiting a positive or negative sentiment, as well as the strength of the user's sentiment. In some embodiments, user feedback may also be analyzed by the machine learning model to determine or further refine a user's intent with regard to offerings. In some embodiments, a user's feedback is analyzed using known or other natural language processing techniques combined with machine learning techniques of the learning model to determine an intent of the user.

The user's communication session is dynamically modified at operation 330. Session adjustment module 170 may modify a user's communication session by providing instructions to browser module 135 of user device 105. One or more modifications to the communication session may be selected by a machine learning model based on the intent and sentiment of a user. For example, a communication session may be modified to present a user with a particular offering that is selected based on the user's intent and/or sentiment. Additionally and/or alternatively, a communication session may be modified to provide an incentive to a user, such as a discount on an offering. Offerings that do not match a user's intent and/or sentiment may also be removed or filtered from a user's view. In some embodiments, a user may be provided with direct contact information with a vendor. For example, if a user is unsatisfied with offerings and there are no offerings that are a near-enough match for a user's intent, the user may be provided with an email address or telephone number of a vendor so that the user can perform additional research.

Operation 340 determines whether the user has performed a desired action. The desired action may include a user purchasing an offering, a user adding an offering to a shopping cart, a user bookmarking or saving an offering, a user sharing an offering, and/or a user registering for a trial of an offering. If modifying the user's communication session has not encouraged the user to perform a desired action, one or more remedial actions are performed at operation 350. Remedial actions may include further presentation of questions to a user, re-assessment of a user's intent and/or sentiment, and additional modification of the user's communication session.

The machine learning model is updated at operation 360. Modeling module 160 may analyze user activity to update the machine learning model. The outcome of a communication session may indicate whether a particular modification to a user's communication session is successful, including the degree of success. The machine learning model may be updated to encourage communication session modifications that are associated with successful outcomes (e.g., the user performing a desired action) and to discourage modifications associated with unsuccessful outcomes.

Figure 4:
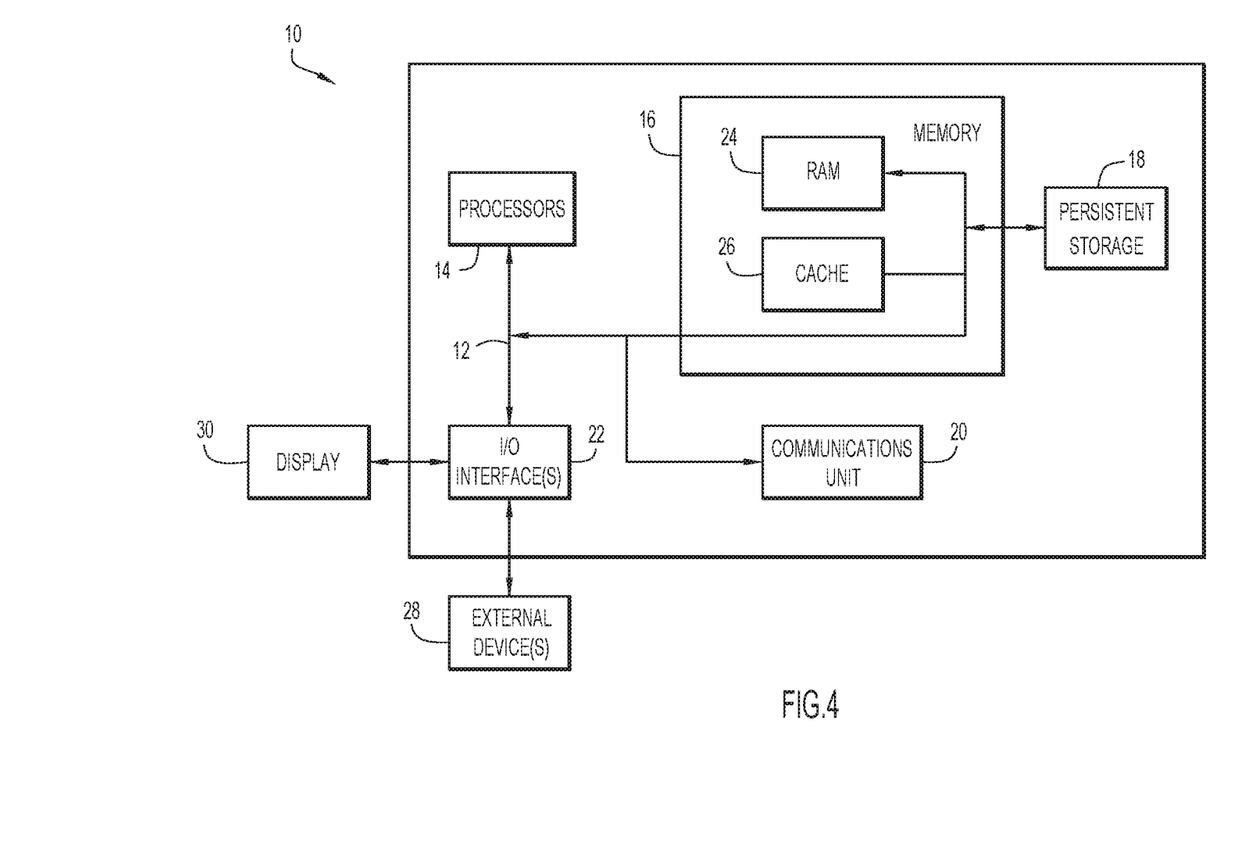
FIG. 4 is a block diagram depicting a computing device in accordance with an embodiment of the present invention.

FIG. 4 is a block diagram depicting components of a computer 10 suitable for executing the methods disclosed herein. Computer 10 may implement user devices 105, session management server 145, and/or electronic commerce server 180 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to analyzing user sentiment to dynamically modify communication sessions (e.g., user activity information, user feedback, user sentiment and intent information, offering information, etc.) may be stored within any conventional or other data structures (e.g., files, arrays, lists, stacks, queues, records, etc.) and may be stored in any desired storage unit (e.g., database, data or other repositories, queue, etc.). The data transmitted between user devices 105, session management server 145, and/or electronic commerce server 180 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to analyzing user sentiment to dynamically generate personalized content recommendations (e.g., user activity information, user feedback, user sentiment and intent information, offering information, etc.) may include any information provided to, or generated by, user device 105, session management server 145, and/or electronic commerce server 180. Data relating to analyzing user sentiment to dynamically generate personalized content recommendations may include any desired format and arrangement, and may include any quantity of any types of fields of any size to store any desired data. The data analyzing user sentiment to dynamically generate personalized content recommendations may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to analyzing user sentiment to dynamically modify communication sessions (e.g., to focus searches to identify desired content faster, etc.)), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of analyzing user sentiment to dynamically modify a communication session (e.g., to focus searches to identify desired content faster, etc.).

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, networking software, browser module 135, modeling module 160, sentiment module 165, session adjustment module 170, etc.). These systems may include any types of monitors and input devices (e.g., keyboard, mouse, voice recognition, etc.) to enter and/or view information.

It is to be understood that the software (e.g., server software, networking software, browser module 135, modeling module 160, sentiment module 165, session adjustment module 170, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, networking software, browser module 135, modeling module 160, sentiment module 165, session adjustment module 170, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to personalized clinical summaries). The database system may be implemented by any number of any conventional or other databases, data stores or storage structures (e.g., files, databases, data structures, data or other repositories, etc.) to store information (e.g., data relating to personalized clinical summaries). The database system may be included within or coupled to the server and/or client systems. The database systems and/or storage structures may be remote from or local to the computer or other processing systems, and may store any desired data (e.g., data relating to analyzing user sentiment to dynamically modify communication sessions (e.g., focus searching to rapidly identify desired content, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of analyzing user sentiment to dynamically modify a communication session comprising:
   capturing one or more user interactions during a communication session, wherein a machine learning model is updated based on the one or more user interactions;
   calculating a likelihood score of a user terminating the communication session before performing one or more desired actions;
   in response to determining that the likelihood score is above a threshold value, presenting, during the communication session, one or more queries to the user, wherein the one or more queries are selected using the machine learning model;
   analyzing received user feedback corresponding to the one or more queries to determine a user sentiment;
   dynamically modifying the communication session based on to the received user feedback and the user sentiment; and
   providing a haptic feedback response on a user device based on the determined user sentiment, wherein the haptic feedback response is generated by a physical vibration device.

2. The computer-implemented method of claim 1, wherein dynamically modifying the communication session comprises:
   identifying one or more offerings associated with a positive user sentiment; and
   adjusting the communication session to present the one or more identified offerings to the user.

3. The computer-implemented method of claim 1, wherein dynamically modifying the communication session includes one or more of: providing an incentive to the user, providing the user with contact information of a vendor, and filtering presented offerings to the user.

4. The computer-implemented method of claim 1, wherein the one or more desired actions include: a user purchasing an offering, a user adding an offering to a shopping cart, a user bookmarking an offering, a user sharing an offering, and a user registering for a trial of an offering.

5. The computer-implemented method of claim 1, wherein the one or more queries comprise structured questions each including one or more responses having user feedback prompts.

6. A computer system for analyzing user sentiment to dynamically modify a communication session, the computer system comprising:
   one or more computer processors;
   one or more computer readable storage media;
   program instructions stored on the one or more computer readable storage media for execution by at least one of the one or more computer processors, the program instructions comprising instructions to:
   capture one or more user interactions during a communication session, wherein a machine learning model is updated based on the one or more user interactions;
   calculate a likelihood score of a user terminating the communication session before performing one or more desired actions;
   in response to determining that the likelihood score is above a threshold value, present, during the communication session, one or more queries to the user, wherein the one or more queries are selected using the machine learning model;
   analyze received user feedback corresponding to the one or more queries to determine a user sentiment;
   dynamically modify the communication session based on to the received user feedback and the user sentiment; and
   providing a haptic feedback response on a user device based on the determined user sentiment, wherein the haptic feedback response is generated by a physical vibration device.

7. The computer system of claim 6, wherein the program instructions to dynamically modify the communication session comprise instructions to:
   identify one or more offerings associated with a positive user sentiment; and
   adjust the communication session to present the one or more identified offerings to the user.

8. The computer system of claim 7, wherein the program instructions to dynamically modify the communication session include instructions to perform one or more of: provide an incentive to the user, provide the user with contact information of a vendor, and filter presented offerings to the user.

9. The computer system of claim 7, wherein the one or more desired actions include: a user purchasing an offering, a user adding an offering to a shopping cart, a user bookmarking an offering, a user sharing an offering, and a user registering for a trial of an offering.

10. The computer system of claim 7, wherein the one or more queries comprise structured questions each including one or more responses having user feedback prompts.

11. A computer program product for analyzing user sentiment to dynamically generate personalized content recommendations, the computer program product comprising one or more computer readable storage media collectively having program instructions embodied therewith, the program instructions executable by a computer to cause the computer to:
   capture one or more user interactions during a communication session, wherein a machine learning model is updated based on the one or more user interactions;
   calculate a likelihood score of a user terminating the communication session before performing one or more desired actions;
   in response to determining that the likelihood score is above a threshold value, present, during the communication session, one or more queries to the user, wherein the one or more queries are selected using the machine learning model;
   analyze received user feedback corresponding to the one or more queries to determine a user sentiment;
   dynamically modify the communication session based on to the received user feedback and the user sentiment; and
   providing a haptic feedback response on a user device based on the determined user sentiment, wherein the haptic feedback response is generated by a physical vibration device.

12. The computer program product of claim 11, wherein the program instructions to dynamically modify the communication session comprise instructions to:
   identify one or more offerings associated with a positive user sentiment; and adjust the communication session to present the one or more identified offerings to the user.

13. The computer program product of claim 11, wherein the program instructions to dynamically modify the communication session include instructions to perform one or more of: provide an incentive to the user, provide the user with contact information of a vendor, and filter presented offerings to the user.

14. The computer program product of claim 11, wherein the one or more desired actions include: a user purchasing an offering, a user adding an offering to a shopping cart, a user bookmarking an offering, a user sharing an offering, and a user registering for a trial of an offering.

15. The computer program product of claim 11, wherein the one or more queries comprise structured questions each including one or more responses having user feedback prompts.

\* \* \* \* \*